_United States Patent_ [19]

Pacific

[11] 4,105,220
[45] Aug. 8, 1978

[54] IMPACT PROTECTION PAD
[75] Inventor: William L. Pacific, Somerville, Mass.
[73] Assignee: Rogers Foam Corporation, Somerville, Mass.
[21] Appl. No.: 776,931
[22] Filed: Mar. 11, 1977

Related U.S. Application Data

[63] Continuation of Ser. No. 613,063, Sep. 15, 1975, abandoned.

[51] Int. Cl.² .......................... B62J 23/00; B62J 27/00
[52] U.S. Cl. .............................. 280/289 E; 74/551.8; 280/289 H; 428/377
[58] Field of Search .......... 280/289 H, 289 G, 289 E; 74/551.9, 551.8, 558; D12/114, 118, 126; 428/377, 32; 403/229, 222, 221, 223

[56] References Cited
U.S. PATENT DOCUMENTS

| | | | |
|---|---|---|---|
| 573,796 | 12/1896 | Rockwell | 428/32 X |
| 580,336 | 4/1897 | Mortimer | 74/551.9 |
| 2,946,840 | 7/1960 | Palmer | 428/377 X |
| 3,183,578 | 5/1965 | Kennedy | 428/377 X |
| 3,654,061 | 4/1972 | Berwanger | 428/377 |
| 3,762,982 | 10/1973 | Whittington | 428/377 |

FOREIGN PATENT DOCUMENTS 17,166 of 1898 United Kingdom .................... 74/551.9

OTHER PUBLICATIONS

Hunt–Wilde Advertizement, American Bicyclist and Motorcyclist, 5–1975, Inside Back Cover, p. 63.
Matthews Motocross Advertizement, American Bicyclist and Motorcyclist, 8–1973, p. 91.

_Primary Examiner_—John P. Silverstrim
_Attorney, Agent, or Firm_—Kenway & Jenney

[57] ABSTRACT

A one-piece, self-mountable impact protection pad suitable for bar-mounted applications, for instance a handlebar crosspiece on a motorcycle. The body comprises a cylinder of closed cellular foam plastic having an axial through hole and a helical-shaped slit to permit distortion of the body for wrapping about the crosspiece, bar or the like.

3 Claims, 4 Drawing Figures

4,105,220

IMPACT PROTECTION PAD

This is a continuation, of application Ser. No. 613,063, filed Sep. 15, 1975 (now abandoned).

SUMMARY OF THE INVENTION

This invention relates generally to impact protection pads mountable upon bars, rods, tubes, cylinders or otherwise shaped elongate bodies for protection of persons or apparatus from impact. More particularly, it relates to self-mountable pads, that is, pads that do not require mounting hardware or other means of securing them in place.

A principal object of this invention is to provide a tubular pad that is mountable to an elongate object (hereinafter referred to for simplicity as a "bar") by wrapping over the surface as contrasted to slipping the pad in place over one end. A typical illustrative application is the crosspiece of the handle bar on a motorcycle, bicycle or the like where the handle grips, throttle controls, brake levers, and in some cases brackets for other parts, substantially prevent a pad from being slipped into position over the end of the handle.

The elimination of mounting hardware, snaps, hooks and the like eliminates a danger of injury to the rider of the motorcycle. In addition, further objects of the invention are to provide the rider with equal protection regardless of the side of the bar with which he comes into contact in the event of an accident, to provide a pad that is inherently waterproof throughout to eliminate the need for application of a waterproof finish or covering, and to provide a pad that is pleasing in appearance without the necessity for covering it with a fabric or the like.

With the foregoing and other objects hereinafter appearing in view, the features of this invention include a one-piece, self-mountable impact protection pad comprising a generally cylindrical body or tube of flexible cellular plastic material having an axial hole and a single slit, both the hole and the slit extending from end to end thereof. The outer periphery of the slit lie in a substantially helical line around the surface of the body. The slit extends from the surface of the body to the hole, thereby making it possible to distort the body by twisting and then winding it about the bar or other elongate structure to which the pad is applied.

DRAWINGS

DETAILED DESCRIPTION

Figure 1:
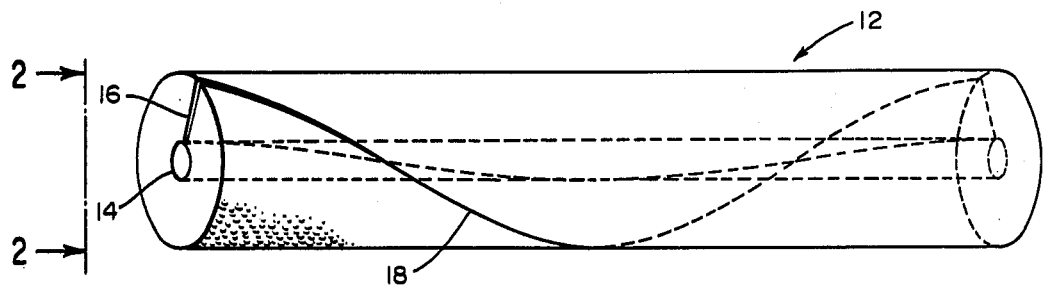
FIG. 1 is a diagonal projection of the preferred embodiment shown in its undistorted, unstressed state.
Figure 2:
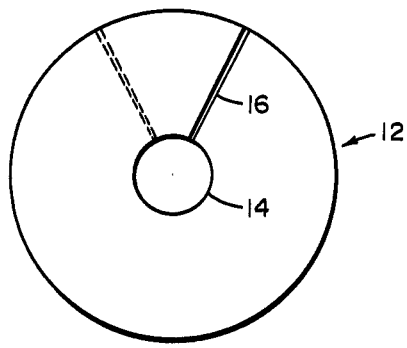
FIG. 2 is an end elevation taken on line 2—2 of FIG. 1.

Referring to the drawings, the preferred embodiment comprises a one-piece body 12 of cylindrical tubular shape, comprising a flexible cellular plastic material of uniform composition. The body may be either fabricated or molded in the cylindrical shape. The body has a round axial hole 14 extending from end to end. A single slit 16 extends between the hole 14 and the surface of the body 12. The hole 14 may be formed in the same operation as the cylindrical shape, or it may be bored out with a drill similar to a woodworking drill with the body 12 suitably supported in an annular support.

Materials for fabricating the body 12 are commercially available and comprise continuous lengths of cylindrical rod foam material extruded or molded by the manufacturer.

In fabrication, the first step is to cut the rod to a desired length to fit on the exposed crosspiece of a motorcycle handlebar, or the like. The slit 16 is then cut in the rod with a hot wire, a knife or a reciprocating saw with the rod mounted on a rotary mandrel. The outer periphery of the slit lies in a substantially helical line 18 extending around the surface of the body.

The slit 16 is preferably formed so that in any cross section of the body 12, the slit is substantially a straight line extending between the helical line 18 and the hole 14. It is not essential that this line be straight, nor does it necessarily lie in a radius of the body 12, although the illustrated embodiment shows the slit as substantially the locus of radial lines extending between the helical line 18 and the hole 14.

Various materials may be employed for the body 12. These are preferably closed cellular materials, as it has been found that these have superior performance for impact protection. Cushioning effect is produced by compressing the gas within the cells of the material, thereby providing excellent energy absorption under impact. This is in contrast to materials of an open-celled, reticular or porous construction in which energy absorption results solely from the elastomeric resiliency of the material. Thus the preferred closed cellular foam materials absorb energy both by reason of material resiliency and the "air bag" effect of gas compression.

Examples of suitable materials are latex, vinyl chloride and polypropylene foams, although the presently preferred form is a crosslinked thermoplastic polyethylene foam having a nominal density of about two pounds per cubic foot. Continuous lengths of this material in round cross section are available from Hercules Incorporated, of Wilmington, Delaware under the designation "L-200." However, successful use has also been made of non-crosslinked, thermoplastic polyethylene foam of the type sold by Dow Chemical Company under the trademark "Ethafoam." The crosslinked material is preferred as being more rugged than the non-crosslinked form. Crosslinked forms are extensively manufactured at the present time by several companies as a result of the development of both irradiation and chemical crosslinking processes. Commonly, the latter employ organic peroxides as the crosslinking agents. Materials formed by either of these crosslinking processes are suitable for the present application. In either case, their density is substantially greater than that of materials conventionally used in impact protection pads, which is typically around 1.2 pounds per cubic foot.

Figure 3:
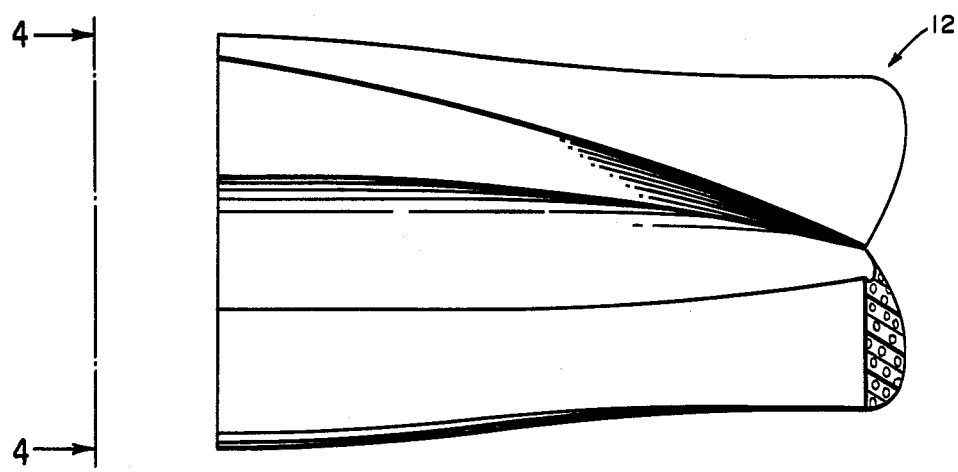
FIG. 3 is a fragmentary longitudinal elevation of one end of the pad in distorted configuration preparatory to mounting upon a bar.
Figure 4:
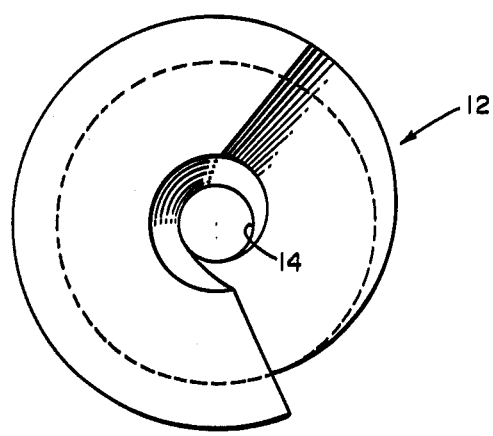
FIG. 4 is an end elevation taken on line 4—4 of FIG. 3.

In use, the body 12 is installed on a handlebar or other elongate object by manually opening the slit 16, starting at one end, and forcing the slit over the bar so that the bar eventually fits within the hole 14. The body 12 is subjected to torsion in the direction required for opening the slit 16, as shown in FIGS. 3 and 4, similarly to the way a helical spring can have its turns forced apart by twisting it. The body 12 is then progressively wrapped over the bar until the bar slips entirely within the hole 14. Thereafter, the inherent resiliency and stiffness of the material of the body hold it firmly in position on the handlebar and resist any inadvertent removal. Thus no further means are required to secure or hold the impact protection pad in position and it is restored to its undistorted configuration except for such distortion as may result from the curvature of the handlebar.

It will be seen that the above-described invention achieves all of the stated objects. In addition, the impact protection pad may be installed without the use of any tools or accessory parts. The finished appearance of the installed pad is that of a substantially unbroken, smooth surface that may resemble leather in texture and color if an appropriate pigmentation is either included in the formulation prior to solidification, or applied to the surface in liquid form either before or after installation. Any other color may also be used or applied in like manner. The pad is waterproof, comprising a substantially water-impervious, closed cellular structure, and therefore an outer covering is not required. The choice of coloring material, if any, is determined by the desired appearance without reference to its waterproofing capability.

I claim:

1. An impact protection pad for mounting on a vehicular handle bar of uniform circular cross section, said pad in the unmounted and unstressed state, comprising a unitary, generally cylindrical body of uniform composition comprising flexible closed cellular plastic material, said body being radially deformable upon impact and being solid except for an axial hole and a single slit both extending from end to end thereof, the hole having a substantially smaller diameter than said body, the outer periphery of the undistorted slit lying in a substantially helical line around the surface of said body and the configuration of the undistorted slit in any cross section of said body being a substantially straight line extending between said helical line and said hole, said body having sufficient resiliency to permit the slit to be opened for wrapping on to a handle bar of substantially the same diameter as said hole and sufficient stiffness to resist distortion and removal from said handle bar without added peripheral support.

2. An impact protection pad according to claim 1, in which the configuration of the undistorted slit is substantially the locus of radial lines extending between said helical line and said hole.

3. An impact protection pad according to claim 1, in which the body comprises a polyethylene foam material.

* * * * *